United States Patent [19]

Kramer

[11] Patent Number: 4,542,464
[45] Date of Patent: Sep. 17, 1985

[54] AUTOPILOT SYSTEM

[75] Inventor: Melvin G. Kramer, Riverton, Wyo.

[73] Assignee: The Brunton Company, Riverton, Wyo.

[21] Appl. No.: 405,986

[22] Filed: Aug. 6, 1982

[51] Int. Cl.$^4$ .................... G06F 15/50; G05D 1/08
[52] U.S. Cl. ............................ 364/457; 364/447; 318/588; 114/144 RE
[58] Field of Search ............ 364/443, 447, 457, 424; 318/580, 588, 589; 340/987; 377/24, 31, 45; 114/144 R, 144 RE

[56] References Cited

U.S. PATENT DOCUMENTS

| | | | |
|---|---|---|---|
| 3,843,873 | 10/1974 | Beville et al. | 377/45 |
| 4,145,605 | 3/1979 | Marcus | 377/45 |
| 4,250,403 | 2/1981 | Nomura et al. | 377/24 |

Primary Examiner—Gary Chin
Attorney, Agent, or Firm—John E. Reilly

[57] ABSTRACT

Apparatus for steering a vessel and maintaining it on a preset course through the combination and arrangement of an incremental encoder and a heading reference circuit is disclosed. The encoder includes circuitry operative to generate a directional signal and count pulse for each incremental movement of the vessel away from the preset heading and for transmitting same into a heading reference circuit. Counting means are included in the heading reference circuit including adjustable reference setting means to set the counter at a reference position corresponding to the preset heading. The counter is responsive to the pulses received from the incremental encoder to count in a positive or negative direction under the control of the directional signals. A sign-detector in the counter detects whether the total number of pulses is positive or negative with respect to the reference position and generates a signal representative of the direction of the net change.

14 Claims, 2 Drawing Figures

AUTOPILOT SYSTEM

SPECIFICATION

This invention relates to closed loop steering control systems, and more particularly relates to a novel and improved autopilot which is primarily adaptable for use as a part of the steering control system in a marine craft.

BACKGROUND AND FIELD OF THE INVENTION

The basic function of any autopilot for marine vessels and the like is to establish a predetermined heading or course coupled with the capability of selectively modifying or deviating from a selected course. In more recent years, various types of electrical systems have been employed in association with a compass or other navigational aid to sense deviations from a selected course heading and to generate correction signals in order to return the vessel to the correct heading or course. Representative approaches are disclosed in U.S. Pat. Nos. 3,660,743 to W. Kundler et al; 3,665,281 to Y. Hirokawa; 3,670,227 to W. Kundler et al; 3,691,978 to D. S. Bond; 3,696,282 to Y. Hirokawa et al; 3,699,420 to W. Kundler et al; 3,741,474 to S. Kawada et al; 3,771,483 to D. S. Bond; 3,919,961 to J. A. McDougal; 3,927,635 to I. Masuzawa et al; 4,038,528 to J. T. Fowler; 4,074,648 to R. E. Reid et al; 4,103,638 to J. T. Fowler; and 4,129,087 to J. G. Dimmick et al. Characteristically, however, in such systems where a digital compass is employed to sense the actual course heading, the signals representative of course heading are transferred or transmitted as absolute numbers in a digital code which represents the actual bearing of the vessel. It is proposed to greatly simplify the method and means by which the steering of a vessel can be controlled. In this relation, it is desirable that both the amount of change and direction of a vessel can be sensed instantaneously with counteracting signals generated so as to return the vessel to its original heading. At the same time, it is desirable that the steering control permit selection of a new heading or course either to temporarily or permanently change course heading.

SUMMARY OF THE INVENTION

It is therefore an object of the present invention to provide for a novel and improved autopilot system capable of steering a craft in a desired direction while avoiding deviation from the desired heading in a simplified and dependable manner.

It is another object of the present invention to provide for a marine autopilot system which is conformable for use in any sized craft, is highly compact and requires a minimum number of parts which can be readily incorporated into the existing steering control systems of vessels.

A further object of the present invention is to provide for a novel and improved automatic piloting system which is highly sensitive to changes in heading and extremely accurate in correcting for such changes through simplified electronic circuitry for detecting and responding to a combination of pulses and directional signals representing changes in heading.

It is an additional object of the present invention to provide for an autopilot system in which deviations from a selected course or heading are accurately and rapidly sensed by incremental encoding means, the encoding means so arranged and associated with a heading reference circuit as to produce incremental signals representative of the magnitude and direction of deviation from a selected course heading; and further wherein selected changes in course heading may be made without interrupting the normal steering function of the vessel.

It is a still further object of the present invention to provide in a marine craft steering control system a novel and improved method and means to establish priority between signals received from displacement sensing means and manually operated steering control means so that both are capable of operating either simultaneously or independently of one another.

A preferred form of the present invention resides in apparatus for steering a vessel and the like and for maintaining it on a preset heading or course through the novel combination and arrangement between incremental encoder means and a heading reference circuit. The encoder includes circuitry operative to generate a directional signal and count pulse for each increment of movement of the vessel away from a preset heading and for transmitting same into a heading reference circuit. In the heading reference circuit, counting means includes adjustable reference setting means which will set the counting means at a reference position corresponding to a preset heading, the counting means being responsive to the pulses received from the incremental encoder to count in a positive or negative direction under the control of the directional signals. Sign-detection means associated with the counting means detects whether the total number of pulses is positive or negative with respect to the reference position, or in other words, whether the number of "up" pulses is greater than the number of "down" pulses over a given time interval and will generate a signal representative of the sign (or direction) of the net change. The signal generated by the sign-detection means is combined with the magnitude of the sum total of the incremental pulses for delivery to analog means, the latter operative to produce a correction signal in response to the magnitude and direction of pulses received from said counting means and sign-detection means, respectively. In a conventional manner, the analog device will transmit such correction signals to steering control apparatus to return the vessel to its preset heading. A related feature of this invention resides in the use of reference position sensing means associated with the sign-detection means to cause the counting means to count in ascending numerical order from its reference or "zero" position accompanied by an appropriate positive or negative sign whereby to prevent the counting means from rolling over to its next highest count.

The heading reference can be changed through port and starboard switching means which applies steering control pulses through the heading reference circuit to cause the vessel to change its course or direction independently of the incremental encoder means. Nevertheless, the heading reference circuit includes priority logic which will permit the pulses and signals applied by said incremental encoder means to override any pulses received from the port and starboard switching means so that the vessel is corrected for actual deviations from its course heading before it can respond to any manually imposed steering commands. In addition, the vessel can be steered to a new heading and the counting means adjusted to the new reference position by heading reset means independently of the port and starboard switching means and incremental encoder means.

The above and other objects, advantages and features of the present invention will become more readily understood and appreciated from a consideration of the following detailed description of a preferred embodiment of the present invention when taken together with the accompanying drawings in which:

DETAILED DESCRIPTION OF THE PREFERRED EMBODIMENT

Figure 1:
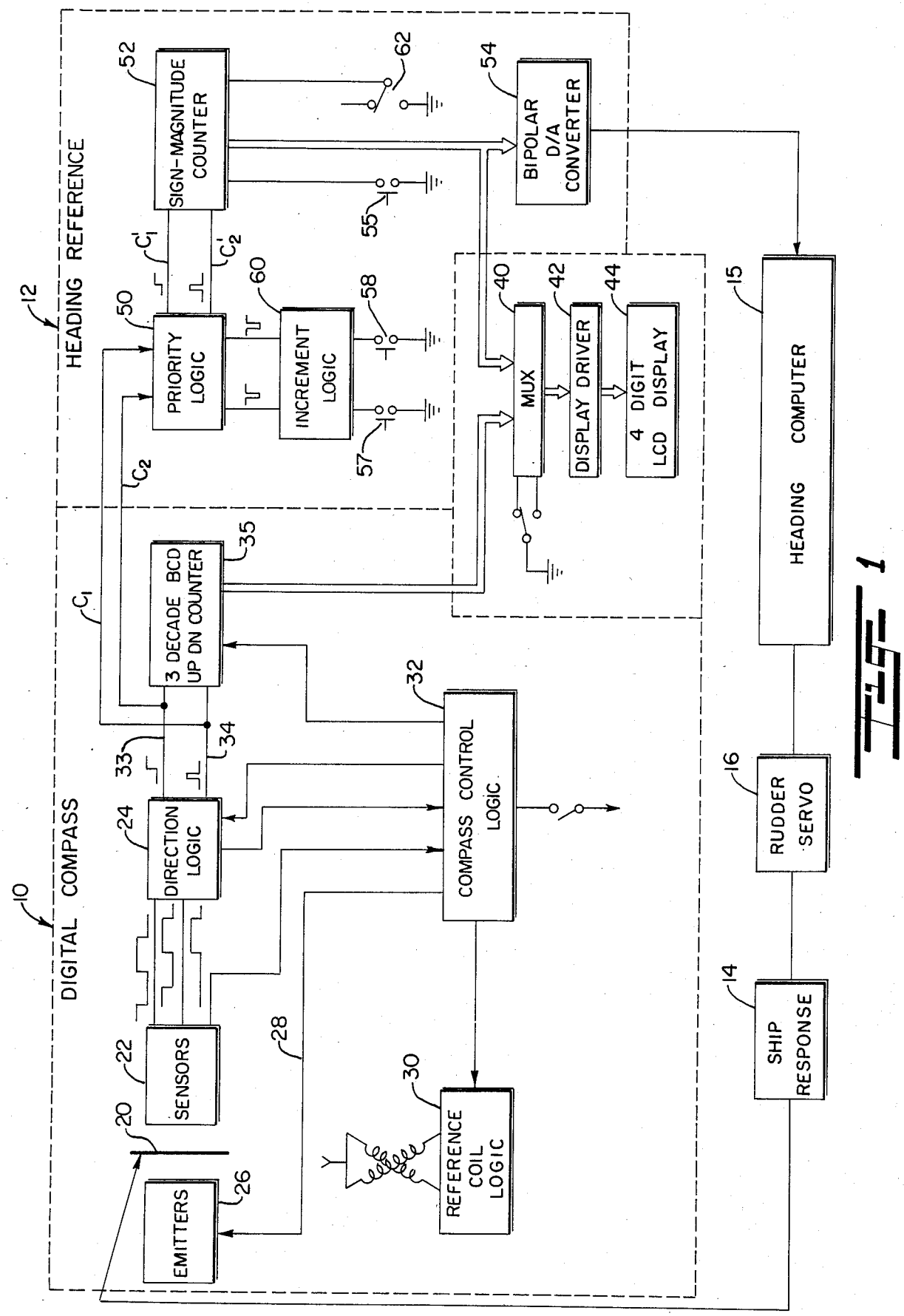
FIG. 1 is a flow diagram illustrating the interrelationship between a digital compass and heading reference in the preferred form of autopiloting system in accordance with the present invention.

Referring in more detail to the drawings, there is illustrated in FIG. 1 an autopilot system comprised of a digital compass system 10 employed in association with a heading reference circuit 12 to control the steering of a vessel represented at 14 through a heading computer 15 and rudder servo system represented at 16. Broadly, the system and circuitry devised is a closed loop servo system whereby any correction applied to the angular position of the rudder resulting in a change in heading or bearing of the vessel will result also in a change in compass position.

As a setting for the present invention, the preferred form of digital compass 10 may be of the type set forth and described in my U.S. Pat. No. 4,095,348 which is incorporated by reference herein. As illustrated in FIG. 1 and described in more detail in my hereinbefore referred to patent, the digital compass employs incremental encoding through the interrelationship of a disk 20, sensor unit 22 and direction logic circuitry 24 in establishing the zero or reference point of the compass and for counting the angular displacement from that reference point in a manner to be described. Briefly, when the compass is turned on, a constant current drive supplies power to the emitters 26 over input line 28. Power is also applied to the reference coil logic 30 to achieve zero referencing for the compass. The sensors represented at 22 respond to any movement of the disk 20 from its reference setting to generate a combination of signals representing the incremental displacement and direction of movement of the disk. The signals are applied to direction logic circuit 24 and to counter 35. Interaction of these signals and the control logic 32 result in proper sequencing of the compass.

The signals received from the directional logic 24 and applied to the up counter 35 are modified somewhat from those described in said U.S. Pat. No. 4,095,348 in the respect that they are converted in a conventional manner by means of an OR circuit and latch into a directional signal which is applied over line $C_1$ and count or clock pulses applied over line $C_2$, the latter representing increments of movement of the disk 20 in a particular direction. As designated in the drawing, the directional signal which represents the direction of movement of the disk will be high or at "1" as long as the pulses are applied in a "down" mode and will go low or be at "zero" when the pulses are in an "up" mode, i.e., moving in an opposite direction. Specifically, the generation of a count pulse and directional signal conveys the same information as the up/down pulses generated by the direction logic in my hereinbefore referred to patent. For purposes of the present invention, however, the directional signals and count pulses generated by the direction logic 24 are applied over lines 33 and 34 to the up/down counter 35 in the digital compass section to cause it to count either up or down depending upon the directional signal received. Conventional circuitry is employed also in combination with that described for multiplexing the information represented at 40 and, through display driver 42, to display that information on any suitable form of digital display 44. The display 44 will reflect either the compass heading or the number of degrees and the sign or direction of displacement away from the heading reference position. Further, as described in my patent, special circuitry is utilized to determine the zero point on the compass disk 20 and to set the up-down counter to "000°" as opposed to permitting the counter to advance beyond "359°". This avoids the use of additional circuitry which would otherwise be required to cause the up-down counter to advance from "359°" to "000°".

The foregoing description is provided more by way of illustration and not limitation for an understanding of the advantages and features of the present invention, particularly the characteristics of the signals and pulses derived from the direction logic 24 over lines $C_1$ and $C_2$ which represent both the direction and incremental displacement of the compass from a given reference setting entirely independently of the numerical indication of the compass reading which is derived and depicted on the display 44.

Broadly, in the heading reference block 12, the direction signals and count pulses from lines $C_1$ and $C_2$ are transmitted into a priority logic circuit 50 from which those signals and pulses are gated into up/down counter 52. The counter 52 has an adjustable reference or "zero" setting to be described which represents the desired course or heading for the vessel. Any change in heading or course of the vessel will, through the movement of the disk 20, result in the generation of directional signals and count pulses which when applied to the up/down counter 52 will generate counteracting output signals in a bipolar digital-to-analog converter 54; and through the heading computer 15 will cause the vessel to return to its original heading. In order for the counter 52 to return to zero or its original reference setting, it must then receive a corresponding number of pulses from the compass circuit and in a direction which will cause the counter 52 to return to zero. The heading of the vessel can be changed by power steering to a new course and pressing a "heading reset" button represented at 55 which will then modify the reference setting in the counter. Moreover, if it is desired to change the heading of the vessel, starboard and port pushbutton switches 57 and 58, respectively, are provided to deliver pulses through increment logic circuit 60 and the priority logic circuit 50 for delivery over the lines $C'_1$ and $C'_2$ into the counter 52. The priority logic circuit 50 will, in a manner to be described, give priority to pulses received from the digital compass to those from the port or starboard switches 57 and 58 so that the compass pulses can be entered into the counter 52 before it can respond to manual command signals received from the port or starboard switches to cause a change in course heading. An on-off switch 62 permits the autopilot system to be selectively engaged or disengaged as desired.

Figure 2:
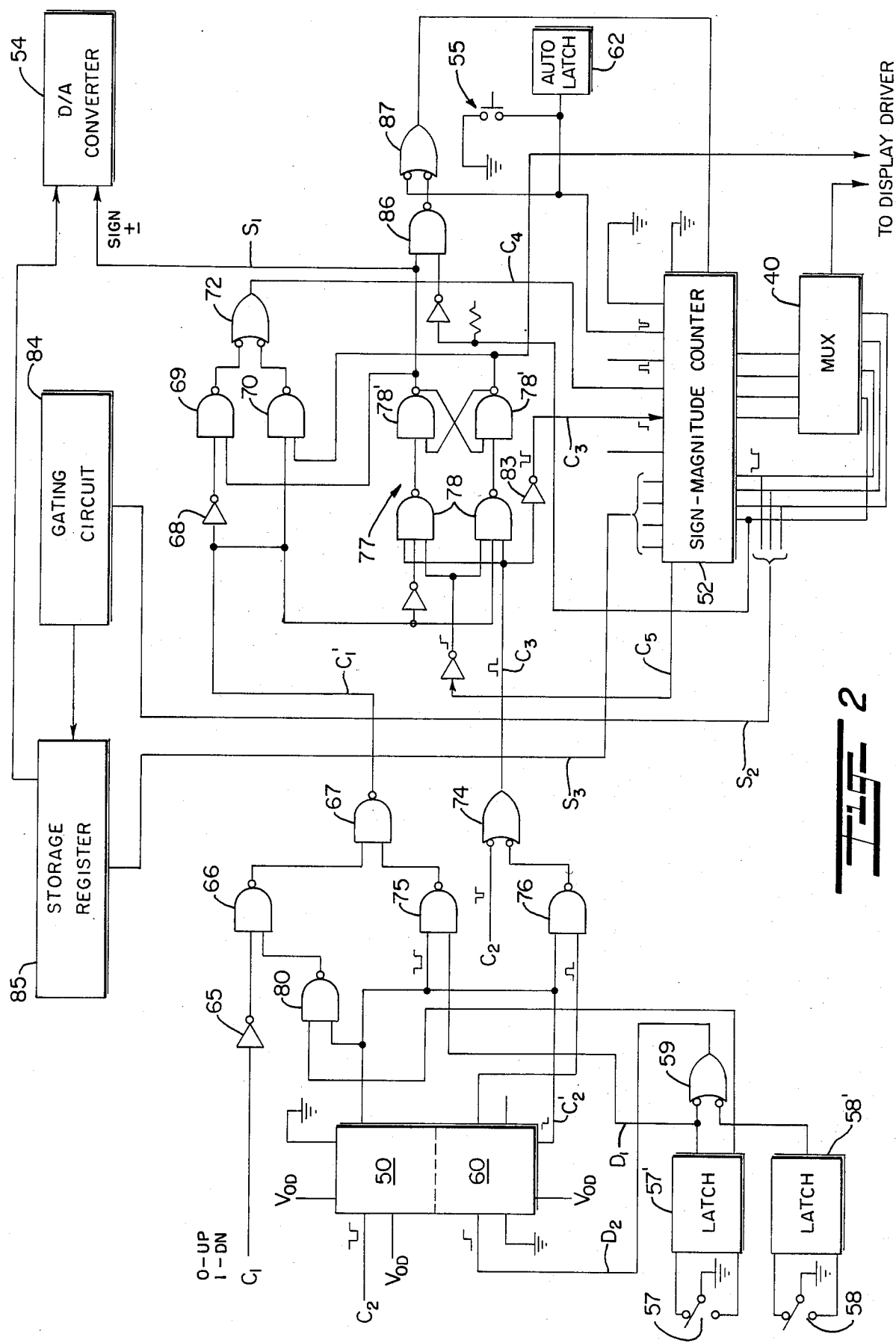
FIG. 2 schematically illustrates in more detail the block diagram of the circuitry employed in the heading reference in the preferred embodiment of the present invention.

Considering in more detail the heading reference circuit as shown in FIG. 2, the directional signal on line $C_1$ is applied through inverter 65 and gated through NAND gates 66 and 67 whenever a clock pulse is applied over line $C_2$ into the increment logic circuit 50. The output signal $C'_1$ from gate 67 is inverted by the inverter 68 and applied to NAND gates 69 and 70 and is input to one side of OR gate 72 which in turn applies the signal over line $C_4$ to the up/down pin of the counter 52. Accordingly, the counter 52 will count in the clock or count pulses applied over line $C_3$ through inverter 83 in an up or down direction under the control of the directional signal applied over line $C_4$. The directional signal applied over line $C_4$ is a high or low-level signal as indicated, depending on the vessel's direction of movement.

Both the priority logic circuit 50 and increment logic circuit 60 are defined by one-shots which serve in effect to give priority to the information received from the compass over that received from the switches 57 and 58. For instance, when a count pulse is received in the priority logic 50 from line $C_2$, it is output as a longer term signal $C'_2$ to a NAND gate 80, to the CLEAR input of the lower one-shot defining increment logic 60 and to one side of NAND gates 75 and 76. The effect of applying the signal into the CLEAR input of the increment logic 60 is to block any pulse that would have been received from the port or starboard switches 57 and 58. Count pulses are applied over line $C_2$ directly to one side of gate 74 which is enabled to deliver a clock pulse over line $C_3$ to the counter 52. NOR gate 74 accepts count pulse signals from either the compass on line $C_2$ or from the increment switches 57 and 58 via the one-shot circuit 50.

The clock pulses are delivered directly into the counter 52 over line $C_3$ from the input side of NAND gate 78. Assuming that the clock pulses which arrive at the counter 52 are in a down mode, when the counter reaches zero it will deliver an output signal over line $C_5$ to the input sides of the NAND gates 78 so that the next count pulse received will reset the latches 78' and cause a reversal of the directional signal delivered through gates 69, 70 and OR gate 72 in order to reverse the direction of count of the counter 52. This will cause the counter 52 to reverse its count in an up direction in response to the next pulse received after reaching zero, even though that pulse would represent continued movement of the disk 20 in a down or negative mode. At the same time, the latch 78' will reverse the sign of the signal delivered over line Sl to the D/A converter 54 so that, even though the counter 52 has started to count back in an up direction, those counts will be transmitted to the D/A converter accompanied by a negative sign so that the converter will recognize those counts as being a continuation of the incremental movement of the vessel in a downward direction below the zero position; or, in other words, has passed through the reference setting in the opposite direction.

Those counts or pulses which are accumulated in the counter 52 are directed over lines $S_2$ and $S_3$ and are clocked into storage registers 85 with the aid of a gating circuit 84 forming a part of the D/A converter 54. In the manner described, the clock pulses which would normally cause the counter to roll over at the zero position to the number "999" now instead cause it to count up from "zero" to "1" by reversing the count sequence in the counter. Correspondingly, when the count sequence is reversed and the counter reaches zero in the up mode, another output signal from the zero output pin will enable the gates 78 to set the latch 78' and reverse the sign of the directional signal to the D/A converter. Whichever sign is established by the latch 78' is applied through gates 86 and 87 to drive the minus side of the display 44 so that the display will indicate whether the number displayed from the counter 52 is plus or minus.

In a similar manner, the port and starboard switches 57 and 58 operate through the increment logic circuit 60 to deliver clock pulses in a desired direction into the sign magnitude counter 52 to steer the vessel in a given direction away from its preset heading. Each switch 57 and 58 operates through a debounce latch 57' and 58', respectively, to deliver through OR gate 59 clock pulses over line $D_2$ which are then applied by the increment logic 60 through NAND gates 76 and 74 over line $C_3$ into the counter. In addition, a directional line $D_1$ from debounce latch 57' applies a pulse through NAND gate 75 which, in a manner similar to that of directional signals applied over line $C_1$, will determine the direction of the logic or in other words the direction of counting. It is important to recognize that pulses are applied by either of the port and starboard switches 57, 58 as the vessel is continuing on its preset heading. The effect of delivering clock pulses into the counter 52 from either switch 57 or 58 is to change its reference setting or zero position, since it will receive the counts and cause correction signals to be applied to the D/A converter 54 in a particular direction to steer the boat away from its original heading. As a result, as the counts are directed from the counter 52 into the D/A converter 54, the effect will be to establish new heading or reference positions for the counter along the course dictated by the number of pulses received from one of the port or starboard switches In normal practice, count pulses received from the directional logic 24 of the incremental encoder in response to movement of the vessel offcourse will be instantaneously delivered into the heading reference block and specifically the counter 52. Those pulses will in turn be clocked out of the counter 52 into the storage register section 85 of the D/A converter 54 so that the vessel is incrementally corrected as pulses are generated by the digital compass system and updated continuously through the closed loop servo system. In that respect, the storage registers 85 play little or no part in the continuous updating or transmission of the count or signal into the D/A converter. However, in certain situations, it is necessary to store or accumulate a number of counts in the storage registers and for the D/A converter to be responsive to that number of counts, such as, when a series of count pulses are received from either of the port or starboard switches 57 or 58; or when the power steering in the vessel is activated to directly control the movement of the rudder and which would effectively disengage or overcome the analog signals applied from the converter in response to course error. In other words, whenever the power steering is activated, it will override the D/A converter into the heading computer 15 and assume control of the vessel so that the counts are effectively stored until the autopilot is permitted to reassume its control over the vessel. Thus, if the vessel is turned 180° by the power steering, the counts stored or accumulated by the counter 52 in the storage registers then would be ordered out of the D/A converter 54 and cause counteracting signals to be applied through the rudder servo system until the boat or vessel is returned to its original reference position or heading.

A somewhat different condition obtains when either of the port or starboard switches 57 or 58 is depressed to generate pulses into the sign-magnitude counter 52: As noted earlier, when pulses are applied by depressing either switch a succession of times, the vessel will continue on its preset heading. The effect of delivering the count pulses from either switch together with the directional signal from the switch into the magnitude counter is to change its reference setting or position, since the counter 52 will receive the counts and cause correction signals to be applied through the D/A converter 54 in a particular direction to steer the boat away from the preset heading for a number of increments corresponding to the number of pulses received from either switch. Again, when the counts are directed into the D/A converter 54, a new heading or reference position is established in the counter along the course dictated by the number of pulses applied by the port or starboard switch. To serve as an illustration, if the vessel is headed on a 180° course and its course is to be changed to 185°, the starboard button or switch would be depressed five times. An injection of five pulses into the counter 52 then would result in a course change of the same number of pulses to return the counter to its new zero or reference position.

The heading can also be changed by turning the autopilot switch off and steering to a new heading and then turning the autopilot on; or the vessel can be power steered through the rudder servo to a new heading and the "heading reset" button 55 pushed. The effect of depressing the heading reset button will be to clear both the counter 52 and storage register of any counts and establish a new reference position in the counter 52 at the new heading. Of course, if the vessel is power steered to a different heading and the heading reset switch is not closed, the vessel will return to its original heading. In such case, the count will be stored and accumulated in the storage register 85 as the vessel is directed to the different heading, then will be ordered out to the D/A converter 54 in returning the vessel to its preset course or heading.

Preferably, the D/A converter 54 is a bipolar converter in which the sign-magnitude digital information is converted to a DC level that is plus or minus with respect to a reference DC level. This DC level is passed to the heading computer 15. Preferably, the heading computer 15 is an analog processor which controls response of the total autopilot's closed loop and insures the stability of the system. The heading computer may be similar in function to several other marine units, such as, the Wesmor AP900B and Wood Freeman Model 500, and is not unique to the system of the present invention. Most importantly, however, the present invention permits continued utilization of the external inputs of the heading computer without disturbing the autopilot system. In this relation, the rudder servo 16 accepts commands from the computer and positions the rudder to follow that command. Accordingly, the vessel will respond and change direction, and in turn, the incremental encoder disk 20 will respond to such change in direction as long as the autopilot is turned on to generate a series of pulses together with the appropriate directional signal or signals into the heading reference block in completing the loop.

The display 44 as described may be utilized to read out either the vessel heading or heading error and which can appropriately be selected and controlled by a switch. In other words, the compass display 44 can be employed as an integral part of the autopilot system.

It is therefore to be understood that various modifications and changes may be made in the precise construction and arrangement of elements comprising the preferred form of the present invention without departing from the spirit and scope thereof as defined by the appended claims.

I claim:

1. In apparatus for steering a vessel wherein steering control means is provided for maintaining said vessel on a preset heading, the improvement comprising:
    incremental encoder means operative to generate signals for each incremental movement of said vessel away from said preset heading including first and second signal-transmitting means for selectively transmitting directional and incremental signals which represent the direction and increments of movement, respectively, of said vessel in a port or starboard direction away from said preset heading;
    counting means including adjustable reference setting means for setting said counting means at a reference position corresponding to said preset heading, said counting means responsive to directional signals received from said first signal-transmitting means to count up or down in response to incremental signals received from said second signal-transmitting means; reference position sensing means operative in response to an incremental signal received after an incremental signal causing said counting means to reach its reference position to reverse the count sequence of said counting means; and
    means producing a correction signal in response to said directional and incremental signals received by said counting means whereby to cause said steering control means to return said vessel to its preset heading.

2. In apparatus according to claim 1, including directional sensing means operative in response to each said directional signal received by said counting means to cause said counting means to add to or substract from each preceding count.

3. In apparatus according to claim 2, said direotional sensing means applying a directional signal to said counting means which is correlated with said incremental signals to represent whether the direction of movement of each incremental signal is in a port or starboard direction.

4. In apparatus according to claim 1, including switch means to respectively apply directional and incremental signals to said direction sensing means and counting means independently of said incremental encoder means.

5. In apparatus according to claim 4, including priority logic means selectively ordering the priority of signals from said incremental encoder means and switch means.

6. In apparatus according to claim 1, including heading reset means for selectively changing the reference position of said counting means.

7. In apparatus for steering a vessel wherein steering control means is provided for maintaining said vessel on a preset heading, the improvement comprising:
    incremental encoder means operative to generate a magnitude pulse for each increment of movement and a directional signal representing the direction of movement of said vessel in a port or starboard direction away from said preset heading;

counting means including adjustable reference position setting means for setting said counting means at a zero count corresponding to its preset heading, said counting means responsive to magnitude pulses generated to count up in succession from said zero count in response to one or more magnitude pulse in succession received either in a port or starboard direction;

directional sensing means operative in response to each said directional signal received by said counting means to cause said counting means to add to or subtract from each preceding count; reference position sensing means operative in response to each magnitude pulse received, after a magitude pulse resetting said counting means to zero, to reverse the count sequence of said counting means; and means producing a correction signal in response to the magnitude and direction of each increment of movement received by said counting means to cause said steering control means to return said vessel to said preset heading.

8. In apparatus according to claim 1, said directional sensing means operative in response to a change in the directional signal received to reverse the count sequence of said counting means above said zero count.

9. In apparatus according to claim 7, including switch means for respectively applying magnitude pulses and directional signals to said direction sensing means and said counting means in a port or starboard direction independently of said incremental encoder means whereby to selectively alter the heading of said vessel, and priority logic means interposed between said incremental encoder means and said switch means whereby to cause magnitude pulses and directional signals received from said incremental encoder means to override any magnitude pulses and directional signals from said switch means.

10. In a closed loop autopilot system for steering a vessel and including steering control means for maintaining said vessel on a predetermined heading in which a digital compass is provided with a sensing disk operative in response to angular displacement of said vessel away from a predetermined heading to generate a signal representing a predetermined increment of movement of said vessel in a port or starboard direction away from its predetermined heading and direction logic means is operative in response to the signals received from said disk to generate a magnitude pulse for each said increment of movement together with a directional signal representing the direction of movement of said disk, the combination therewith comprising:

an up/down counter unit including adjustable reference position setting means for setting said counter unit to zero when said vessel is maintained on said predetermined heading, said counter unit including means responsive to each magnitude pulse received from said direction logic to count up one count from zero and to generate a correctional pulse for each count, and including means for generating a zero output signal when said counter unit is returned to zero;

a control circuit including direction sensing means producing a positive or negative signal representing the direction of movement in a port or starboard direction of each magnitude pulse received by said counter unit, said direction sensing means applying a signal to said counter unit in response to a change in the directional signal received from said direction logic means to reverse the count sequence of said counter unit;

reference position sensing means operative in response to each said zero output signal received from said counter unit to cause a change in the directional signal applied to said direction sensing means whereby to reverse the count sequence of said counter unit independently of a change in the directional signal received by said direction sensing means from said direction logic; and means producing a correction signal in response to the magnitude and direction of each correctional pulse generated by said counting circuit whereby to cause said steering control means to return said vessel to said preset heading.

11. In a system according to claim 10, said correction signal-producing means including a digital-to-analog converter for generating a correctional analog signal in response to the combination of a correctional pulse from said counter unit and a directional signal from said direction sensing means.

12. In a system according to claim 10, including switch means for respectively applying magnitude pulses and directional signals to said direction sensing means and said counting means whereby to selectively alter the heading of said vessel in a port or starboard direction independently of magnitude pulses and directional signals received from said direction logic means.

13. In a system according to claim 12, whereby said switch means is operative to change the zero setting in said counter unit to correspond to the altered heading of said vessel.

14. In a system according to claim 13, including priority logic means associated with said switch means whereby to cause magnitude pulses and directional signals from said direction logic means to override magnitude pulses and directional signals simultaneously applied by said switch means.

* * * * *